United States Patent
Abrahamian et al.

(10) Patent No.: US 10,089,363 B2
(45) Date of Patent: Oct. 2, 2018

(54) METHOD AND APPARATUS FOR IDENTIFYING USERS WHO KNOW EACH OTHER

(71) Applicant: AT&T Intellectual Property I, L.P., Atlanta, GA (US)

(72) Inventors: Edmond J. Abrahamian, Richmond Heights, MO (US); David E. Patterson, Los Altos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 358 days.

(21) Appl. No.: 14/884,609

(22) Filed: Oct. 15, 2015

(65) Prior Publication Data
US 2017/0109353 A1   Apr. 20, 2017

(51) Int. Cl.
*G06F 17/30* (2006.01)
*H04W 4/02* (2018.01)

(52) U.S. Cl.
CPC .... *G06F 17/3053* (2013.01); *G06F 17/30867* (2013.01); *H04W 4/02* (2013.01)

(58) Field of Classification Search
CPC . G06F 17/3053; G06F 17/30867; H04W 4/02
USPC .......................................................... 707/734
See application file for complete search history.

(56) References Cited

U.S. PATENT DOCUMENTS

| | | | | |
|---|---|---|---|---|
| 5,272,474 A * | 12/1993 | Hilliard | ................. | G06Q 10/02 340/286.09 |
| 6,356,841 B1 * | 3/2002 | Hamrick | ................. | G08G 1/205 701/484 |
| 6,507,802 B1 * | 1/2003 | Payton | ................. | G06Q 99/00 702/150 |
| 6,681,108 B1 | 1/2004 | Terry et al. | | |
| 8,550,706 B2 | 10/2013 | Appelman | | |
| 8,583,659 B1 * | 11/2013 | Alexandrescu | ..... | G06F 17/3053 707/705 |
| 9,215,560 B1 * | 12/2015 | Jernigan | ............... | H04W 4/021 |

(Continued)

FOREIGN PATENT DOCUMENTS

| WO | WO 01/37232 | 5/2001 |
|---|---|---|
| WO | WO 2004/088943 | 10/2004 |

OTHER PUBLICATIONS

Yu, Bin "Distributed Reputation management for Electronic Commerce" 2002. pp. 1-16.

(Continued)

*Primary Examiner* — Phuong Thao Cao (57) ABSTRACT

A method and apparatus for identifying a plurality of users of a service of a network service provider as users known to each other are disclosed. For example, the method implemented via a processor obtains location information of a plurality of users of a service of a network service provider, selects a subset of users from the plurality of users that are deemed to be stationary, generates a score for each particular pair of users selected from the subset of users, determines for each particular pair of users, whether the score that is generated is greater than or equal to a threshold, identifies the pair of users as users who know each other, when the score for the particular pair of users is greater than or equal to the threshold, and performs an analysis to provide an offer to the pair of users, wherein the offer is based on the pair of users being identified as users who know each other.

19 Claims, 3 Drawing Sheets

(56) References Cited

U.S. PATENT DOCUMENTS

| | | | |
|---|---|---|---|
| 9,319,832 B2* | 4/2016 | Crowley | H04W 4/02 |
| 9,544,392 B2* | 1/2017 | Posse | G06F 17/30867 |
| 9,547,877 B2* | 1/2017 | Chung | G06Q 10/1053 |
| 9,622,038 B2* | 4/2017 | Vaccari | H04W 4/025 |
| 2009/0112982 A1 | 4/2009 | Kuhlmann et al. | |
| 2009/0319288 A1 | 12/2009 | Slaney et al. | |
| 2010/0149036 A1* | 6/2010 | Rosenberg | G06Q 30/02 |
| | | | 342/357.31 |
| 2010/0194632 A1* | 8/2010 | Raento | H04M 1/72572 |
| | | | 342/357.25 |
| 2010/0280920 A1* | 11/2010 | Scott | G01S 5/0027 |
| 2011/0137818 A1* | 6/2011 | Goad | G06Q 30/02 |
| | | | 705/347 |
| 2011/0294520 A1* | 12/2011 | Zhou | H04W 48/04 |
| | | | 455/456.1 |
| 2011/0300875 A1* | 12/2011 | Kim | G01S 19/16 |
| | | | 455/456.1 |
| 2012/0258715 A1* | 10/2012 | Souissi | H04W 36/14 |
| | | | 455/436 |
| 2013/0117369 A1 | 5/2013 | Appelman et al. | |
| 2013/0325394 A1* | 12/2013 | Yuen | A61B 5/0002 |
| | | | 702/150 |
| 2013/0325946 A1* | 12/2013 | Allison, Jr. | G06Q 50/01 |
| | | | 709/204 |
| 2013/0331119 A1* | 12/2013 | Vaccari | H04W 4/02 |
| | | | 455/456.1 |
| 2014/0040162 A1* | 2/2014 | McConnell | G06F 17/30312 |
| | | | 705/347 |
| 2014/0122375 A1* | 5/2014 | Li | G07B 15/02 |
| | | | 705/418 |
| 2014/0189530 A1 | 7/2014 | Anand et al. | |
| 2014/0195530 A1* | 7/2014 | Milton | G06Q 30/02 |
| | | | 707/734 |
| 2015/0088914 A1* | 3/2015 | Zeng | H04L 67/22 |
| | | | 707/751 |
| 2015/0134476 A1* | 5/2015 | Barbieri | G06Q 30/0278 |
| | | | 705/26.7 |
| 2015/0169597 A1* | 6/2015 | Edge | G06F 17/3087 |
| | | | 707/751 |
| 2015/0193888 A1 | 7/2015 | Sayed | |
| 2015/0248689 A1* | 9/2015 | Paul | G06Q 30/0222 |
| | | | 705/14.23 |
| 2015/0269165 A1* | 9/2015 | Work | G06Q 10/00 |
| | | | 707/734 |
| 2015/0278375 A1* | 10/2015 | Kim | G06F 17/30867 |
| | | | 707/734 |
| 2015/0324362 A1* | 11/2015 | Glass | G06F 17/3053 |
| | | | 707/725 |
| 2015/0347591 A1* | 12/2015 | Bax | G06Q 30/0269 |
| | | | 707/749 |
| 2016/0063649 A1* | 3/2016 | Zamer | G06Q 50/01 |
| | | | 705/39 |
| 2016/0065628 A1* | 3/2016 | Guo | H04L 65/403 |
| | | | 709/204 |
| 2016/0105840 A1* | 4/2016 | Smiley | H04W 48/04 |
| | | | 455/418 |
| 2016/0112941 A1* | 4/2016 | Desai | H04L 12/145 |
| | | | 370/329 |
| 2016/0127486 A1* | 5/2016 | Chen | G06F 3/04817 |
| | | | 709/206 |
| 2016/0162586 A1* | 6/2016 | Maxwell | H04W 4/21 |
| | | | 707/733 |
| 2016/0189228 A1* | 6/2016 | Vaccari | G06Q 30/0261 |
| | | | 705/14.58 |
| 2016/0212588 A1* | 7/2016 | Garcia | H04W 4/029 |
| 2016/0261544 A1* | 9/2016 | Conover | H04L 51/32 |
| 2016/0294836 A1* | 10/2016 | Williams | H04L 63/102 |
| 2016/0358214 A1* | 12/2016 | Shalunov | G06Q 30/0241 |
| 2016/0364409 A1* | 12/2016 | Memon | H04W 4/021 |
| 2017/0032416 A1* | 2/2017 | Soni | G06Q 30/0254 |
| 2017/0099358 A1* | 4/2017 | Perez | H04L 51/046 |
| 2017/0109353 A1* | 4/2017 | Abrahamian | G06F 17/3053 |

OTHER PUBLICATIONS

Yang, Shuang Hong "Friend or Frenemy? Predicting Signed Ties in Social Networks" 2012. pp. 1-10.

Lauterbach, Debra "Surfing a Web of Trust: Reputation and Reciprocity on CouchSurfing.com" 2009. pp. 1-8.

Brown, Chloe "The Importance of Being Placefriends: Discovering Location-focused Online Communities" 2012, pp. 1-6.

Constine, Josh "Color's Implicit Social Graph and How Facebook Could Respond" Mar. 23, 2011. pp. 1-3.

Diana, Robert "Implicit Social Graphs Rise From Interest Not Location" Mar. 25, 2011. pp. 1-3.

Li, Nan "Analysis of a Location-based Social Network" 2009. pp. 1-8.

"Location-Based Social Networks" 2011. pp. 1-7.

Zheng, Yu "GeoLife2.0: A Location-Based Social Networking Service" 2009. pp. 1-2.

Zheng, Yu "Location-Based Social Networks: Users" 2011. pp. 1-34.

Chatterjee, Seinjuti "Building a Location based Social Graph in Spark at InMobi" Jun. 16, 2015. pp. 1-3.

Cho, Eunjoon "Friendship and Mobility: User Movement in Location-Based Social Networks" 2011. pp. 1-9.

Pelechrinis, Konstantinos "Location-Based Social Network Users Through a Lense: Examining Temporal User Patterns" 2012. pp. 1-8.

"Analyzing and Modeling Location-based Social Networks" Network Data Science Lab (NDSL). pp. 1-6.

A.Le, K. Pelechrinis and P. Krishnamurthy, "Country-Level Spatial Dynamics of User activity: A Case Study in Location-Based Social Networks" in ACM WebSci '14, Bloomington, IN, Jun. 2014.

K. Pelechrinis and T. Lappas, "Mining Emerging User-Centered Network Structures in Location-based Social Networks", in IEEE INFOCOM NetSciCom '14, Toronto, Canada, May 2014.

\* cited by examiner

METHOD AND APPARATUS FOR IDENTIFYING USERS WHO KNOW EACH OTHER

The present disclosure relates to a method and apparatus for identifying a plurality of users of a service of a network service provider who may potentially know each other.

BACKGROUND

A network service provider may gather location information of users. For example, the service provider may gather information as to which cell tower is being used by each particular user to access services at a given time. The service provider may then determine if a particular pair of users are connected to a same cell tower. However, the pair of users being connected to a same cell tower does not imply that they know each other. For example, the pair of users may simply be driving on a same highway, the pair of users may be at a large office building with a large number of occupants all connected to a same tower, the pair of users may be at a large stadium watching a sports event, and so on. As such, simply knowing the pair of users are connected to a same cell tower provides little information as to whether the pair of users know each other.

SUMMARY OF THE DISCLOSURE

In one embodiment, the present disclosure describes a method and apparatus for identifying a plurality of users of a service of a network service provider as users who know each other. For example, the method implemented via a processor obtains location information of a plurality of users of a service of a network service provider, selects a subset of users from the plurality of users that are deemed to be stationary, generates a score for each particular pair of users selected from the subset of users, determines for each particular pair of users, whether the score that is generated is greater than or equal to a threshold, identifies the pair of users as users who know each other, when the score for the particular pair of users is greater than or equal to the threshold, and performs an analysis to provide an offer to the pair of users, wherein the offer is based on the pair of users being identified as users who know each other.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

When a network service provider (e.g., a cellular network service provider) wishes to provide products and/or services to a plurality of users, the service provider may wish to first determine whether a sub-group of the users, e.g., two or more of the users, may know one another. For an illustrative example, the service provider may wish to offer the same type of offer, the same price, the same payment term, the same promotional opportunities, etc. If the users know one another, there is a higher probability that these users will likely discuss the offer among themselves, thereby generating a marketing buzz. In other words, a user accepting a new offer or service may lead to friends of the user having a higher likelihood of adopting the same offer as well, if the same offer is provided to the friends of the user who initially accepted the new offer or service. Thus the service provider would benefit by knowing beforehand, if any of the users to whom an offer for a product and/or a service is being extended know each other.

In order to clearly illustrate the teachings of the current disclosure, the following terminologies will first be described:

Likelihood of a pair of users knowing each other;
Users who know each other; and
Users who do not know each other.

A likelihood of a pair of users knowing each other is defined as a value of a function determined by a statistical method, e.g., a score. In one example, the score is computed using a probabilistic function of one or more parameters. The fact that the value is generated by a statistical method implies that there is no direct evidence that is being used to assess whether or not the pair of users know each other. A direct evidence refers to a record of a communication between the pair of users. The communication may be any standard communication via a service provider network, via a social network, etc., e.g., a call, a text message, an email, etc. For instance, a type of direct evidence for calls may be a call detail record associated with a user device. However, privacy rules often restrict such information from being used for targeted marketing. In addition, if opt-out feature is available, the user may simply opt-out of such record collection for privacy reasons. The method of the present disclosure does not use direct evidence of communication between the pair of users. Instead, the present method uses a statistical method for implying that the pair potentially know each other or do not know each other based on a score. The information used for the statistical approach may be referred to as an indirect evidence for determining whether the pair of users know each other.

To illustrate by way of example, suppose a Person A and a Person B are collocated at a venue with an occupancy size of five people at a particular time $t_1$, Person A and Person B are again collocated in a particular coffee shop on a holiday time $t_2$, Person A and Person B are again collocated at a restaurant on a weekend time $t_3$, and Person A and Person B are again collocated at a leisure location on another holiday time $t_4$. In contrast, suppose a Person C and a Person D are collocated at a stadium that holds 50000 people at a particular time $t_1$, Person C and Person D are again collocated at a train station used by commuters going to a large metropolitan area at time $t_2$, and Person C and Person D are again collocated at a large area school at $t_3$. The numerous detected collocations for Person C and Person D are all at relatively large places (e.g., relatively large geographically defined areas), during times known as being times when people who may not know each other but have similar daily routines, e.g., for work, commute and school, would be located. In contrast, the numerous detected collocations for Person A and Person B are at relatively small places (e.g., relatively small geographically defined areas), during times known as being times when people who know each other will likely spend time together. Thus, the mere fact that Person C and Person D are collocated several times would not necessarily imply that Person C and Person D know each other. Whereas, the type and size of places at which the Person A and Person B are collocated, and the times at which the collocations occurred would elevate the likelihood that Person A and Person B know each other. However, as the example illustrates, in the absence of a direct evidence of communication, determining whether or not a pair of users know each other is not a trivial matter.

The present disclosure broadly describes a method, a computer-readable storage device, and an apparatus for identifying users of a service of a network service provider who potentially may know each other. The users who know each other may then be provided with an offer for a service and/or a product based on being identified as being users who potentially may know each other.

For the example above, the function of the present disclosure would assign a lower score for the likelihood that Person C and Person D know each other as compared to the score for the likelihood that Person A and Person B know each other. The score of each pair of users is then compared to a predetermined threshold. If the value of the function, i.e., the score, for a particular pair of users is determined as being above the predetermined threshold, then the particular pair of users is identified as being a pair of "users who know each other." Conversely, a pair of users are determined as being a pair of "users who do not know each other" when the value of the function is below the predetermined threshold.

In one embodiment, the value of the function may be provided in a predefined range. For example, the range may be zero to one, zero to 100, etc. In one embodiment, the service provider determines the range and the threshold to be used. For example, suppose the range is defined as being zero to one and the predetermined threshold is defined as being equal to 0.7. Then, if a score for a particular pair is greater than or equal to 0.7, the particular pair is determined as being a pair of users who know each other. Otherwise, the pair is determined as being a pair of users who do not know each other. For example, if the score is 0.9, the pair would be determined as being a pair of users who know each other.

Figure 1:
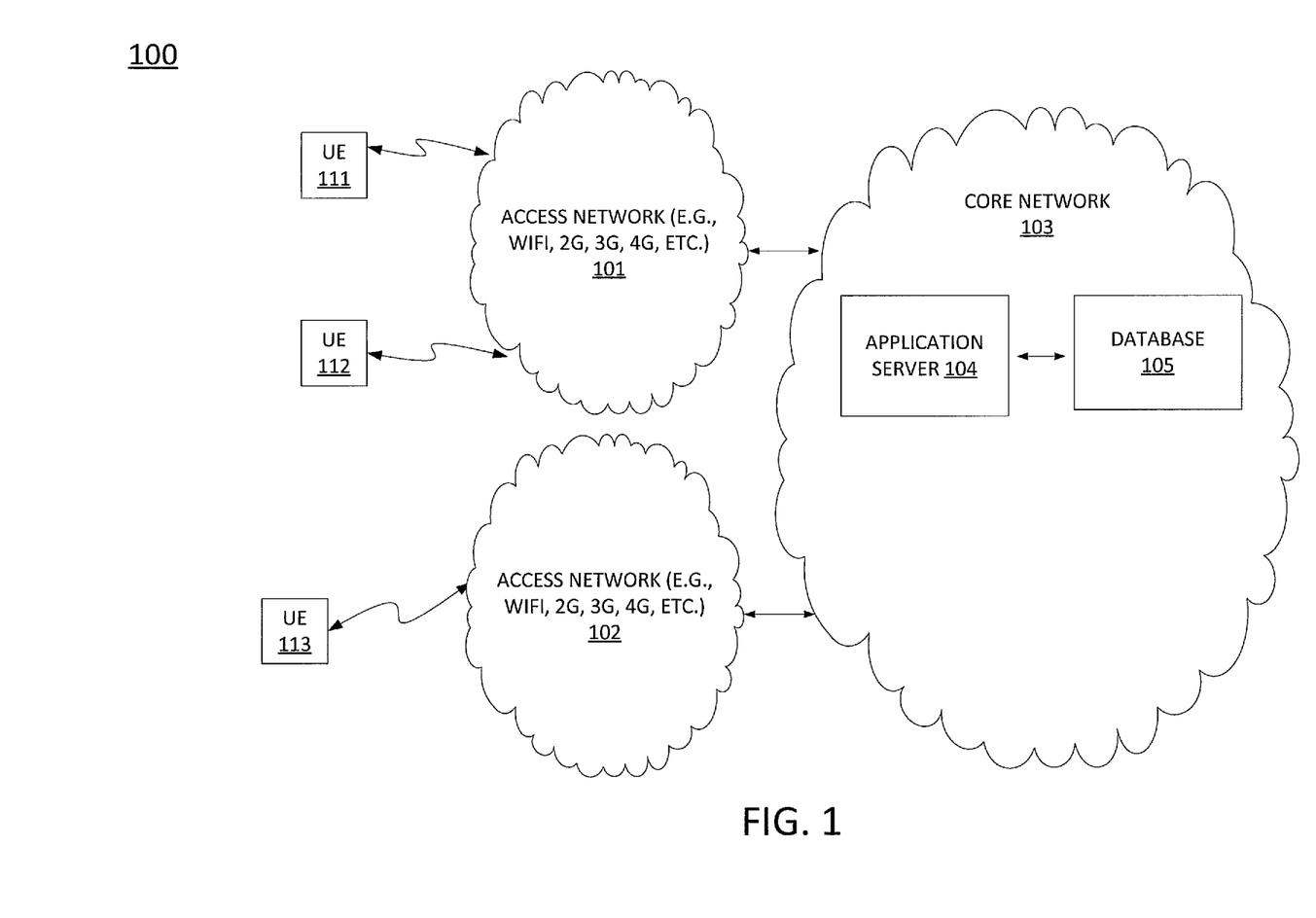
FIG. 1 illustrates an example network related to the present disclosure.

FIG. 1 illustrates an example network 100 related to the present disclosure. In one illustrative embodiment, the network 100 comprises User Endpoint (UE) devices 111-113, access networks 101-102, and a core network 103. Users of UE devices 111-113 may access services from the core network 103 via an access network 101 or 102.

The access networks 101-102 may comprise a Wireless-Fidelity (Wi-Fi) network, a cellular network (e.g., 2G, 3G, and the like), a long term evolution (LTE) network, and the like. The core network 103 may comprise any type of communication network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Figure 3:
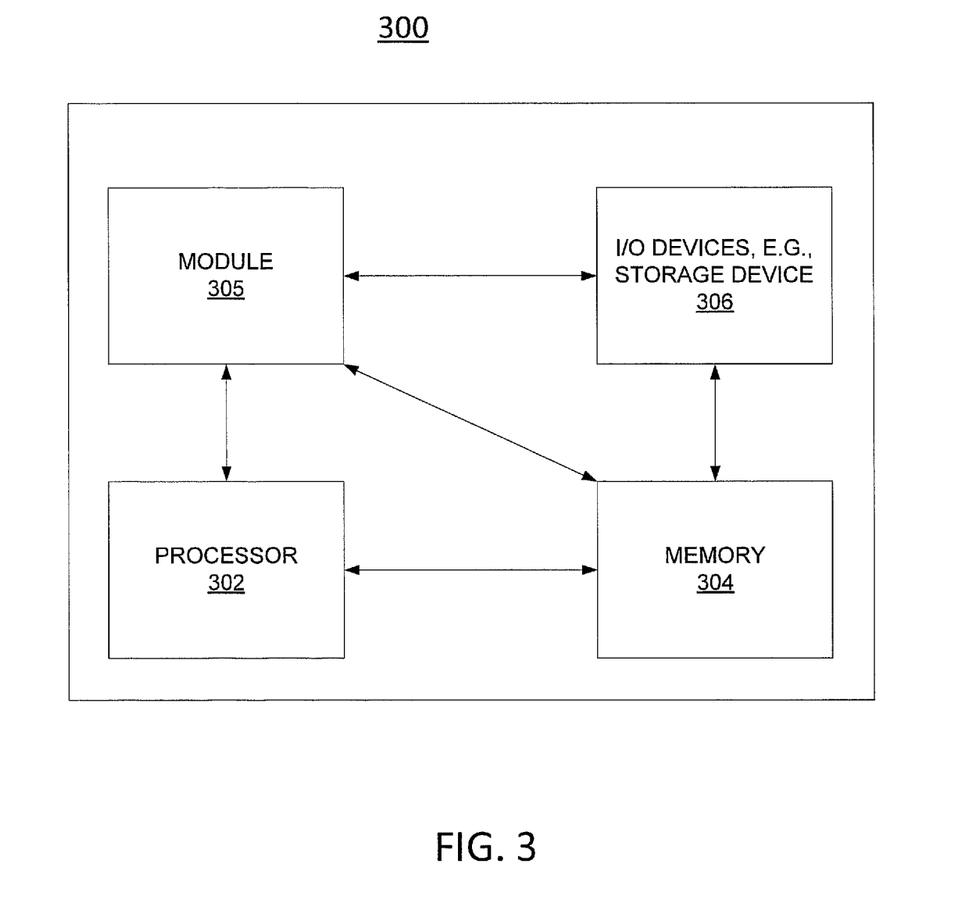
FIG. 3 depicts a high-level block diagram of a computer suitable for use in performing the functions described herein.

In one embodiment, the core network 103 may include an application server (AS) 104, and a database 105. The AS 104 may be deployed as a hardware device embodied as a dedicated computer (e.g., the dedicated computer 300 as illustrated in FIG. 3). In one embodiment, the AS 104 is configured to perform the methods and functions described herein (e.g., the method 200 discussed below).

It should be noted that the network 100 may include additional networks and/or elements that are not shown to simplify FIG. 1. For example, the access network and the core network of FIG. 1 may include additional network elements (not shown), such as for example, base stations, border elements, gateways, firewalls, routers, switches, call control elements, various application servers, and the like.

In one embodiment, the database 105 is used for storing various data, e.g., a list of users, location data associated with the users, a list of parameters and/or values to be used in determining whether or not users know one another, third party data, e.g., data regarding locations of points-of-interest, geo-fencing information for each of the locations of points-of-interest, etc. Although a single database is shown, the various types of data may be stored in any number of databases.

In one embodiment, the AS 104 is used for determining whether or not pairs of users know each other, in accordance with the method of the present disclosure. The AS 104 may also be used to present offers for products and/or services to users identified as being users who know each other. It should be noted that although the present disclosure refers to a pair of users to simplify the discussion of the present method, the present disclosure is not so limited. Namely, the present disclosure is applicable to any two or more users.

In one example, the present disclosure obtains location information of a plurality of users, e.g., location information of UE devices 111-113. In one embodiment, the location information is obtained from one or more of: a Network Event Location System (NELOS), proximity information relative to Wi-Fi networks, proximity information relative to a cell tower (e.g., a base station), proximity information relative to femto-cells, triangulation data, differential GPS information, cell radio identifications, etc. The location information obtained from the various sources may comprise information of varying levels of accuracy. For example, location information based on GPS may be accurate to 5-15 m based on the device, location information based on proximity to a Wi-Fi network may be accurate to 50-100 m, location information based on proximity to cell towers may be accurate to hundreds of meters, and so on. For example, AS 104 may gather the location information from access networks 101-102, and the like.

In one embodiment, a user is considered as being at a particular location only if the user is connected to a particular cell tower for a time period greater than a predetermined threshold (e.g., a predefined period of time). Otherwise, the user is deemed to be moving and the location information is not considered for determination of whether or not the user and someone else know each other. In one example, consider a scenario when a user is on a road/sidewalk near a venue with a Wi-Fi network. The user may appear as being temporarily in the venue, even though the user is simply passing by the venue. In another example, consider a scenario in which two cars are next to each other traveling on a highway at similar speeds. Although, the users are located near each other, the fact that the users are located near each other is irrelevant for determining whether or not the users know each other. In these types of scenarios, the length of attachment to each cell tower would be relatively short. These examples illustrate that filtering out some location data may allow the identification of users who know each other to be more efficient. Accordingly, the present disclosure filters out location data when the length of time for the user being at that location is below the predetermined threshold, thereby eliminating data gathered when the user is deemed to be moving. Thus, the present disclosure is able to filter location information for a plurality of users such that the remaining data set of users will contain only those users that are deemed to be "stationary" and not "moving." It should be noted that the terms "stationary" and "moving" are relative terms and are not intended to mean that a "stationary" user is not moving at all. Said another way, a user is deemed to be moving with respect to a particular location is that the user is transient with respect to that location for a period of time, e.g., a predefined amount of time such as 1 minute, 5 minutes, one hour, and so on. Thus, in one example, a user determined to be within a location for less than one minute can be deemed to be "moving" (e.g., traveling in a car or walking down the street). In another example, a user determined to be within a location for more than one hour can be deemed to be "stationary" (e.g., sitting in a restaurant, a coffee house, an apartment, or a classroom, and so on.)

The determination of whether a person is moving or not may take on an additional treatment. Due to various conditions such as topological or atmospheric variations, building density, and the like, tower handoffs (i.e., the change in connection from one cell tower to another) may take on certain repetitive patterns. For example, if a user's cellular device is attached to tower 1, and by virtue of certain conditions, user's cellular device flip-flops between towers 1 and 2 (for example: 1-2-1-2-1), the user's cellular device may be considered, for that duration, to be stationary if the durations between handoffs within the pattern meets certain time criteria. Examination of various such patterns can lead to rules that determine whether a device is stationary or moving. These rules are then added to those discussed above to determine whether a user is moving or stationary.

The location information that is obtained from the various sources, while the users are not deemed to be moving, may then be processed by AS 104 to generate a score for each pair of users selected from the plurality of users. For example, the score for a particular pair of users is determined using a function of one or more parameters and the score is used to indicate a likelihood of the particular pair of users knowing each other. Each of the one or more parameters is defined to quantify a relevance of the pair of users being collocated, at a particular location, for determining whether the pair of users know each other. In other words, each parameter quantifies a quality of location data for use in determining whether or not the pair of users know each other.

Returning to the function that generates the score for the likelihood of the pair of users knowing each other, suppose the function that generates the score is defined as S(T, D, Q), wherein T, D and Q represent a temporal parameter, a distance parameter, and a location parameter, respectively for determining a quality of a co-location within the distance, at the particular location and time. Suppose a corresponding range for S(T, D, Q) is defined as being between zero and one.

Then, S(T, D, Q) may be represented as: S(T, D, Q)=$W_T f$(T)+$W_D f$(D)+$W_Q f$(Q), wherein $W_T$, $W_D$ and $W_Q$, represent weight factors for the relevance of the temporal, distance and location parameters for the generating of the score. The summation of $W_T$, $W_D$ and $W_Q$ is equal to one.

For example, the function $f$(T) provides a sub-score for a co-location data in terms of one or more temporal aspects. The one or more temporal aspects may comprise: a time of day, a day of week, a season within a year, whether or not a day of the co-location is associated with a holiday, and a length of time when the users were co-located. Then, in one embodiment, $f$(T) may be based on the time of day, the day of week, the particular season, whether or not the day on which the co-location is observed falls on a holiday, and a length of time for the co-location being greater than a predetermined duration.

In one embodiment, the $f$(T) is determined while assigning variable weights for the one or more temporal aspects, with the summation of the weights assigned to the one or more temporal aspects being set to one. For example, if a time of day is considered equally relevant to that of a day of week, the season is considered twice as relevant to that of the day of week, whether or not the day of the co-location is on a holiday is not relevant at all, and the length of time is also not relevant at all, a weight may be assigned as follows for $W_{time\ of\ day}$, $W_{day\ of\ week}$, $W_{season}$, $W_{holiday}$, and $W_{length\ of\ time}$. Then, $W_{holiday}$ is set to zero, $W_{length\ of\ time}$ is set to zero, $W_{season}$ is set to 0.5, $W_{time\ of\ day}$ is set to 0.25, and $W_{day\ day\ of\ week}$ is set to 0.25. Then, $f$(T) would be determined as: $0.5 \times f_1$(season)+$0.25 \times f_2$(time of day)+$0.25 \times f_3$(day of week), wherein the $f_1$(season), $f_2$(time of day) and $f_3$(day of week) provide a score that is a function of a parameter season, a score that is a function of a parameter time of day, and a score that is a function of a parameter day of week, respectively. For each of the functions $f_1$(season), $f_2$(time of day) and $f_3$(day of week), the sum of the scores across the respective parameter is equal to one. For example, for $f_2$(time of day), if the day is divided into 3 non-overlapping time intervals, the scores of the function $f_2$(time of day) for the three non-overlapping time intervals add up to one. Based, on which one of the three times of day during which the two users are observed as being at the same location, $f_2$(time of day) is assigned one of the three scores.

Similarly, the function $f$(D) provides a sub-score for a co-location data in terms of distances between pairs of users. For example, users that are co-located while being with a few meters of each other would be assigned a higher sub-score as compared to users that are co-located but with large distances in between, e.g., over 50 meters. In one example, two users being connected to a same cell tower would provide a co-location with an accuracy of about 300 ft. In another example, two users being connected to a same Wi-Fi network would provide a co-location with an accuracy of about 50 meters. In yet another example, if the locations are based on location information obtained from the user devices, e.g., coordinate data obtained via Global Positioning System (GPS), a co-location within an accuracy of 15 meters may be obtained. Thus, $f$(D) may be assigned a higher sub-score when the locations are based on GPS data as compared to when they are based on being connected to a same cell tower.

The function $f$(Q) provides a sub-score for a co-location data in terms of a quality of the location at which the users are located. The quality of the location takes into account aspects about the location itself, wherein each aspect is evaluated for relevance as to whether or not a pair of users know each other. In order to determine the quality of the location for relevance as to whether or not a pair of users know each other, the method of the present disclosure first obtains a list of points-of-interest (POIs) from a third party. The list that is obtained from the third party provides, for each POI, a geographical coordinate (e.g., latitudinal location, longitudinal location and/or altitudinal location) of the POI, a category of the POI, a sub-category of the POI, and a size and/or occupancy level of the POI. For example, the method may obtain a list from a third party for thousands of POIs to cover a selected geographical region, e.g., continental U.S., North America, South America, Europe, Asia, Africa, Australia, a particular country, a particular state, a particular city, a particular county, a particular township, and so on. For each particular POI of the thousands of POIs, the method may then receive a geographical coordinate of the particular POI, a category of the particular POI, a sub-category of the particular POI, and a size, a geo-fencing boundary, and/or occupancy level of the particular POI.

In one embodiment, the geographical coordinate of the POI may be the coordinate of a center of the POI. If the shape of the POI is known, the geographical coordinate may be that of a location reported by many users, a location of a retailer within the boundaries of the POI, etc.

In one embodiment, the category of the POI may be associated with one or more of: a traveling landmark (e.g., a road, a bridge, a tunnel, a rest area, an exit off of a road, and the like), a business establishment (e.g., a commercial building, a warehouse, an office building, and the like), an eating and/or drinking establishment (e.g., a restaurant, a bar, a pub, a food court, and the like), an educational institution (e.g., a school, a college, a university, a campus, a classroom, and the like), a geographic feature (e.g., a public park, a beach, a harbor, a lake, a golf course, and the like), a health establishment (e.g., a hospital, a clinic, an emergency room, a doctor's office, and the like), a recreational establishment (e.g., a library, a theater, a swimming pool, a tennis court, a basketball court, a baseball field, a football field, a bowling alley, an ice skating ring, a ski slope, a concert hall, a stadium, and the like), a lodging or living accommodation (e.g., a hotel, a motel, a vacation resort, a home, an apartment complex, and the like), a manufacturing establishment (e.g., a manufacturing plant, an assembly plant, and the like), an outdoor commercial site (e.g., a mining site, a quarrying site, an oil drilling site, and the like), a religious establishment (e.g., a place of worship, a church, a synagogue, a temple, a mosque, a shrine, a chapel, and the like), a shopping establishment (e.g., a mall, a store, a department store, a discount outlet, and the like), and/or a transportation establishment (e.g., an airport, a bus terminal, a train terminal, a ferry terminal, a car parking lot, and the like). It should be noted that there are numerous categories that can be used to define various types of POIs. The above list is only illustrative and should not be viewed as exhaustive or as a limitation of the present disclosure.

Additionally, each category of the POIs may further be sub-divided to provide additional granularities, e.g., sub-categories. For example, the recreational establishment category may have sub-categories such as: in-door sports establishment, out-door sports establishment, music establishment, multi-media establishment, and the like). Again, numerous sub-categories can be predetermined for each category of POI.

In one embodiment, the size and/or occupancy level of the POI may be a size selected from one or more of: extra small (XS), small (S), medium (M), Large (L), extra-large (XL), extra-extra-large (XXL), extra-extra-extra-large (XXXL), and jumbo (J). In one embodiment, the size of the POI is expressed in terms of radii from a center of the POI, e.g., in meters. Alternatively, in another embodiment the polygon described by a set of connected points defining the boundaries of the POI, when available, may be used to determine the nominal size of the POI. In another embodiment, the size is expressed in terms of an occupancy level, e.g., an expected number of people occupying the POI.

For example, if the sizes are expressed in terms of radii from the center of the POI, the method may assign the sizes as follows: XS as being a POI with all of its boundaries within 10 meters of the center of the POI, S as being a POI with all of its boundaries within 25 meters of the center of the POI, M as being a POI with all of its boundaries within 75 meters of the center of the POI, L as being a POI with all of its boundaries within 200 meters of the center of the POI, XL as being a POI with all of its boundaries within 400 meters of the center of the POI, XXL as being a POI with all of its boundaries within 600 meters of the center of the POI, XXXL as being a POI with all of its boundaries within 1000 meters of the center of the POI, and J as being a POI with all of its boundaries within 2000 meters of the center of the POI and so on. Similarly, if the size is expressed in terms of an occupancy level, a POI may be defined as an XS POI if the expected number of people to occupy the POI is 5 or less, S if the expected number of people is 6-20, M if the expected number of people is 21-50, L if the expected number of people is 51-100, XL if the expected number of people is 101-250, XXL if the expected number of people is 251-1000, XXXL if the expected number of people is 1001-5000, J if the expected number of people is greater than 5000, and so on. Again, the values provided above are only illustrative and should not be interpreted as a limitation of the present disclosure.

The function $f(Q)$ provides a sub-score for the co-location data in terms of the qualities of the locations at which the users are located together based on all of the above aspects associated with the POI, while taking into account a number of times the users are located together at each particular POI. For example, if the users are located together multiple times but only at a single POI, the sub-score may be reduced to reflect scenarios wherein the users may not know each other but work or live at a same location.

Once, each of the $f(T)$, $f(D)$ and $f(Q)$ is computed, the score $S(T, D, Q)$ is computed as being equal to $W_T f(T) + W_D f(D) + W_Q f(Q)$. If the score $S(T, D, Q)$ is greater than or equal to a threshold set for determining if two users know each other, the method then concludes that the two users know each other and provides an offer for a service and/or a product to the users, wherein the offer is based on the fact that they know each other.

In one embodiment, the method may further base the score $S(T, D, Q)$ on a number of occurrences for the particular pair of users having a same location information over a predetermined period of time. For example, a score for a particular pair of users may first be computed as an average of all the scores for the particular pair of users. In turn, if the average number of occurrences for pairs of users being at the same location is five times over a year, and for a particular pair of users the number of occurrences is 100 times, then the score for the particular pair may be increased to reflect the significant occurrences of collocation above the determined average number of occurrences of collocation.

In one example, the method provides network based services (e.g., cellular services, phone services, network access services (e.g., Internet access services), media access services (e.g., downloading or uploading of multimedia content and the like)), etc., based on users being identified as being users who know each other. Similarly, the method may also provide targeted advertising for a non-network based service and/or product, e.g., a discount for a service or product of a retailer, a merchant, a restaurant, a store, and so on, based on users being identified as being users who know each other.

In one embodiment, the method also provides a confidence level for the determining that the pair of users know each other. For example, if the score that is computed exceeds the threshold, but the difference between the threshold and the score is small, the confidence level would be low. In contrast, if the difference between the threshold and the score is very large, the confidence level would be high. For example, suppose the threshold for determining that two users know each other is 0.60, the score for the pair of users Person A and Person B is 0.99, and the score for the pair of users Person C and Person D is 0.61. Then, both pairs are determined as being pairs of users who know each other. However, the confidence level for the determination that the pair know each other is much higher for Person A and Person B as compared to that of Person C and Person D.

It is important to note that, in the description above, information may not be available for all aspects of POIs. For example, for a particular POI, a category of the particular POI may be received, with no sub-category or size. In addition, the list of categories, sub-categories, sizes, and so on, are intended to be illustrative only. As such, the service provider may define the list of categories, sub-categories, etc., as needed. The service provider may also set and/or update the sizes of POIs and weights for various scores and sub-scores.

Note that the analysis of the present disclosure to determine if users know each other may be performed via a generic analytic engine. However, in one embodiment, such analyses can also be performed in the dedicated AS 104 and other network servers.

Figure 2:
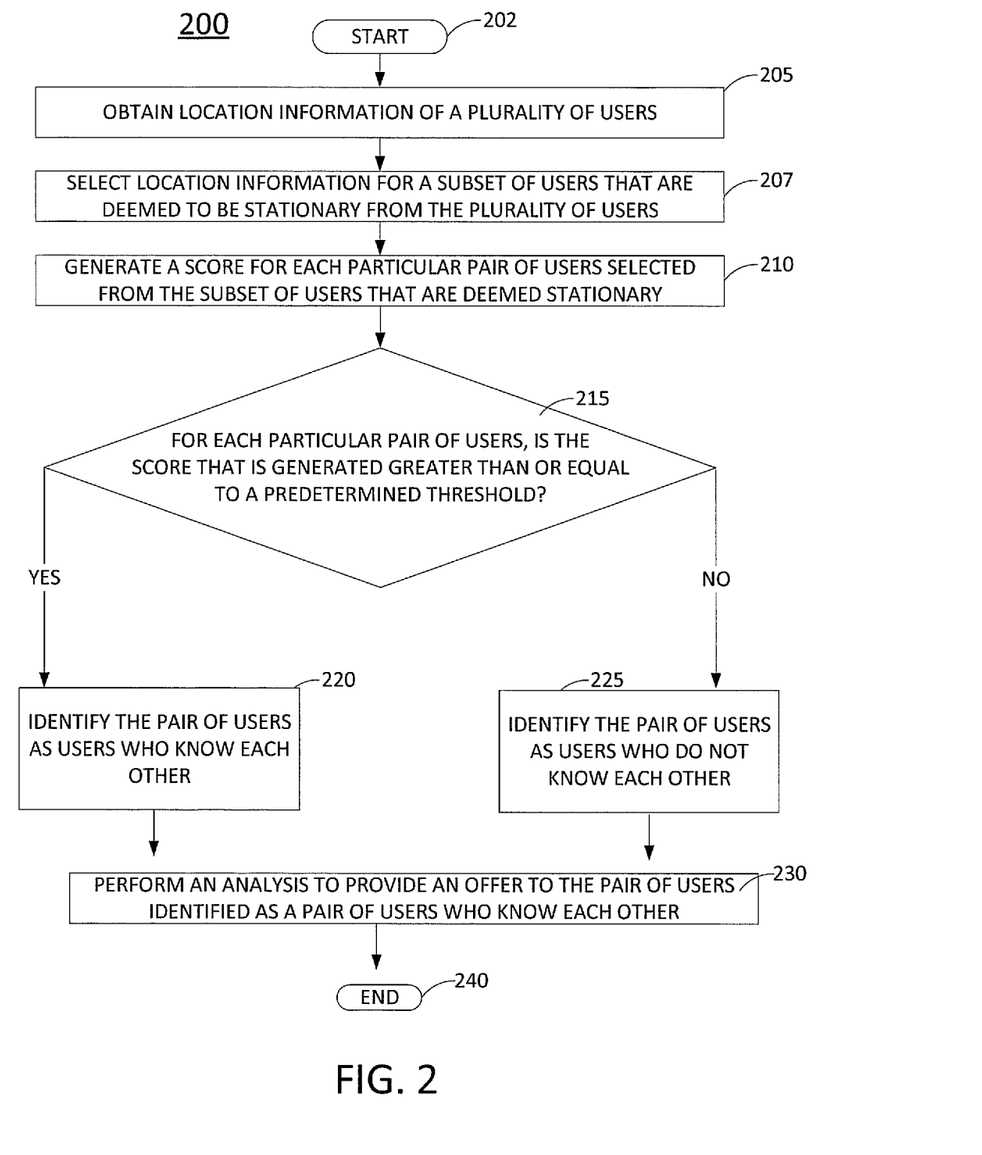
FIG. 2 illustrates an example flowchart of a method of the present disclosure for identifying a plurality of users of a service of a network service provider who may potentially know each other.

FIG. 2 illustrates a flowchart of an example method 200 of the present disclosure for identifying a plurality of users of a service of a network service provider who potentially may know each other. In one embodiment, the method 200 may be implemented in a server, e.g., an application server 104 for the determining which users know each other or the computer or processor 302 as described in FIG. 3. Method 200 starts in step 202 and proceeds to step 205.

In step 205, the processor obtains location information of a plurality of users. For example, the method receives location information from cellular networks, Wi-Fi networks, user endpoint devices (GPS data), and so on.

In step 207, the processor selects location information only for a subset of users from the plurality of users in step 205 that are deemed to be stationary. In other words, the processor may examine the location records of the plurality of users and keeping only those deemed to be stationary, as outlined above. However, any other manner of determining whether a user is moving or stationary can be used in step 207.

In step 210, the processor generates a score, for each particular pair of users selected from the plurality of users. For example, if the range of scores is zero to one, the method generates a score, e.g., 0.6, that indicates a likelihood of the particular pair of users knowing each other. The score can be generated using the functions as described above.

In step 215, the processor determines, for each particular pair of users, if the score that is generated is greater than or equal to a predetermined threshold. For example, if the predetermined threshold for the example above is 0.5, the method determines if the score is above the predetermined threshold (i.e., 0.6≥0.5). If the score is above the predetermined threshold, the method proceeds to step 220. Otherwise, the method proceeds to step 225.

In step 220, the processor identifies, the pair of users, as a pair of users who know each other, when the score is greater than or equal to the predetermined threshold. In step 225, the processor identifies, the pair of users, as a pair of users who do not know each other, when the score is below predetermined threshold. For the example above, the pair of users is identified as a pair of users who know each other. The steps 220 and 225 may be performed in parallel until all pairs are identified as either a pair who know each other or a pair who do not know each other.

In step 230, the processor performs an analysis to provide an offer to the pair of users identified as a pair of users who know each other, wherein the offer is based on the pair of users being identified as a pair of users who know each other. For example, the method may offer the pair of users identical discounts on a service and/or a product.

In one embodiment, the analysis further takes into account as to the type of categories of POIs that were deemed pertinent to the conclusion that the pair of users know each other to tailor the offer of the product and/or service. For example, if the analysis indicated that the pair of users are most likely tennis partners given that the pair of users are consistently detected to be at a tennis court at the same time for a period of time that indicates that the users are likely players and not workers at the tennis court, then a promotion for tennis gear or tennis accessories can be offered to the pair of users. This allows the network service provider to partner with third party vendors or retailers to provide promotions to its subscribers. For example, if the pair of users are subscribers to cellular services, data services and/or telephony voice services from the network service provider, then the network service provider may now offer promotions to sports products to its subscribers. Again, no personal data of the subscribers are provided to the third party vendor or retailer. The third party vendor or retailer may simply provide a limited number of promotions to the network service provider for distribution to its subscribers. It is up to the network service provider to determine which subset of its subscribers would most likely benefit or accept the limited number of promotions. This allows the subscribers to receive an enhanced service and the third party vendor or retailer to receive the greatest return on its promotions. In sum, the analysis will take into account the types of categories of POIs that were instrumental in determining that the pair of users know each other. These same types of categories of POIs can be used to determine the type of promotions that will be offered to users who know each other.

For example, a skiing vacation package can be offered to group of users detected to be skiing with each other on a regular basis. In another example, sports events tickets can be offered to a group of users who are detected to be present at sports events regularly and who play sports with each other regularly at another sports arena, e.g., PGA tour tickets can be offered to users who are detected to be golfing with each other on a regular basis. In another example, a theater and restaurant package deal can be offered to a group of users who are detected to be present at Broadway shows regularly and who then subsequently visit a restaurant together. The above examples illustrate that users who know each other may benefit from promotions that are specifically offered to them due to the very fact that the users know each other. The users are more willing to adopt these promotions and there is a greater chance that the third party vendor or retailer will find greater success with their promotions being offered by the network service provider who is in a better position to determine users who know each other.

Returning to FIG. 2, the method then proceeds either to step 205 to obtain more location information or to step 240 to end processing the current location information.

As such, the present disclosure provides at least one advancement in the technical field of identifying users who know each other. This advancement improves delivery of products and/or services that rely on whether or not the users know each other. Viewed in another manner, the present disclosure provides an efficient way for identifying users who know each other, thereby being able to provide similar offers for products and/or services. In addition, the network service provider is able to enhance customer satisfaction by offering promotions of third party vendor or retailer. For example, when users know each other, they may discuss their respective offers. Group promotions such as group vacation packages (e.g., discount packages for a group of users travelling to a vacation destination), group shopping packages (e.g., discount packages for a group of users travelling to a shopping destination), group entertainment event packages (e.g., discount packages for a group of users travelling to a sporting event destination, a concert event destination, a theater event destination, and the like), will benefit significantly from this channel of delivering group promotions.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for identifying a plurality of users of a service of a network service provider who know each other for providing a promotion, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 305 for identifying a plurality of users of a service of a network service provider who know each other for providing a promotion (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, direct-ing, or cooperating with another hardware device or component (e.g., a co-processor and the like) to perform the operations.

The processor executing the computer readable or software instructions relating to the above described method can be perceived as a programmed processor or a specialized processor. As such, the present module 305 for identifying a plurality of users of a service of a network service provider who know each other for providing a promotion (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
  obtaining, via a processor deployed in a network of a network service provider, location information of a plurality of users of a service of the network service provider;
  selecting, via the processor, a subset of users from the plurality of users that are deemed to be stationary;
  generating, via the processor, a score for each particular pair of users selected from the subset of users, wherein the score is based on a quality of a location at which each particular pair of users is located, wherein the quality of the location is based on a size of a point of interest of the location, wherein the size of the point of interest is expressed in terms of an occupancy level of the point of interest;
  determining, via the processor, for each particular pair of users, whether the score that is generated is greater than or equal to a threshold;
  identifying, via the processor, the pair of users as users who know each other, when the score for the particular pair of users is greater than or equal to the threshold; and
  performing, via the processor, an analysis to provide an offer to the pair of users, wherein the offer is based on the pair of users being identified as users who know each other.

2. The method of claim 1, wherein the score that is generated for the particular pair of users is determined using a function of one or more parameters, wherein the score indicates a likelihood of the particular pair of users knowing each other.

3. The method of claim 2, wherein the one or more parameters comprise one or more of: a temporal parameter, a distance parameter, and a location parameter.

4. The method of claim 1, wherein the score that is generated for the particular pair of users is generated as a weighted sum of a first function that provides a first sub-score that is based on one or more temporal aspects of the location information, a second function that provides a second sub-score that is based on a distance between the particular pair of users, and a third function that provides a third sub-score that is based on the quality of the location at which the particular pair of users is located, wherein the distance is determined in accordance with the location information, wherein the location at which the particular pair of users is located is determined from the location information.

5. The method of claim 4, wherein weights for the first function, the second function and the third function are determined by the network service provider.

6. The method of claim 4, wherein the one or more temporal aspects of the location information comprise one or more of: a temporal aspect for a time of day, a temporal aspect for a day of a week, a temporal aspect for a season, a temporal aspect based on whether or not a day associated with the location information is a holiday, and a temporal aspect for a length of time associated with the location information.

7. The method of claim 4, wherein the quality of the location is based on information obtained from a third party.

8. The method of claim 7, wherein the information obtained from the third party comprises a list of points of interest for a given geographical area, wherein the list of points of interest includes the point of interest of the location at which the particular pair of users is located.

9. The method of claim 8, wherein the information obtained from the third party further comprises one or more of: a geographical coordinate for each point of interest in the list of points of interest, a category of each point of interest in the list of points of interest, a sub-category of each point of interest in the list of points of interest, a size of each point of interest in the list of points of interest, and an occupancy level of each point of interest in the list of points of interest.

10. The method of claim 9, wherein the geographical coordinate for the point of interest in the list of points of interest comprises one or more of: a latitudinal location, a longitudinal location, and an altitudinal location of the point of interest.

11. The method of claim 9, wherein the size of the point of interest is expressed in terms of a radius from a center of the point of interest, or a polygon described by a set of connected points defining the boundaries of the point of interest.

12. A non-transitory computer-readable storage device storing a plurality of instructions which, when executed by a processor deployed in a network of a network service provider, cause the processor to perform operations, the operations comprising:

obtaining location information of a plurality of users of a service of the network service provider;

selecting a subset of users from the plurality of users that are deemed to be stationary;

generating a score for each particular pair of users selected from the subset of users, wherein the score is based on a quality of a location at which the particular pair of users is located, wherein the quality of the location is based on a size of a point of interest of the location, wherein the size of the point of interest is expressed in terms of an occupancy level of the point of interest;

determining for each particular pair of users, whether the score that is generated is greater than or equal to a threshold;

identifying the pair of users as users who know each other, when the score for the particular pair of users is greater than or equal to the threshold; and performing an analysis to provide an offer to the pair of users, wherein the offer is based on the pair of users being identified as users who know each other.

13. The non-transitory computer-readable storage device of claim 12, wherein the score that is generated for the particular pair of users is determined using a function of one or more parameters, wherein the score indicates a likelihood of the particular pair of users knowing each other.

14. The non-transitory computer-readable storage device of claim 13, wherein the one or more parameters comprise one or more of: a temporal parameter, a distance parameter, and a location parameter.

15. The non-transitory computer-readable storage device of claim 12, wherein the score that is generated for the particular pair of users is generated as a weighted sum of a first function that provides a first sub-score that is based on one or more temporal aspects of the location information, a second function that provides a second sub-score that is based on a distance between the particular pair of users, and a third function that provides a third sub-score that is based on the quality of the location at which the particular pair of users is located, wherein the distance is determined in accordance with the location information, wherein the location at which the particular pair of users is located is determined from the location information.

16. The non-transitory computer-readable storage device of claim 15, wherein weights for the first function, the second function and the third function are determined by the network service provider.

17. The non-transitory computer-readable storage device of claim 15, wherein the one or more temporal aspects of the location information comprise one or more of: a temporal aspect for a time of day, a temporal aspect for a day of a week, a temporal aspect for a season, a temporal aspect based on whether or not a day associated with the location information is a holiday, and a temporal aspect for a length of time associated with the location information.

18. An apparatus comprising:
a processor; and
a computer-readable storage device storing a plurality of instructions which, when executed by the processor deployed in a network of a network service provider, cause the processor to perform operations, the operations comprising:

obtaining location information of a plurality of users of a service of the network service provider;

selecting a subset of users from the plurality of users that are deemed to be stationary;

generating a score for each particular pair of users selected from the subset of users, wherein the score is based on a quality of a location at which the particular pair of users is located, wherein the quality of the location is based on a size of a point of interest of the location, wherein the size of the point of interest is expressed in terms of an occupancy level of the point of interest;

determining for each particular pair of users, whether the score that is generated is greater than or equal to a threshold;

identifying the pair of users as users who know each other, when the score for the particular pair of users is greater than or equal to the threshold; and performing an analysis to provide an offer to the pair of users, wherein the offer is based on the pair of users being identified as users who know each other.

19. The apparatus of claim 18, wherein the score that is generated for the particular pair of users is determined using a function of one or more parameters, wherein the score indicates a likelihood of the particular pair of users knowing each other.

\* \* \* \* \*